Dec. 2, 1952           T. AVENIA           2,620,197
VEHICLE FOR JUVENILES
Filed Aug. 27, 1948           2 SHEETS—SHEET 1
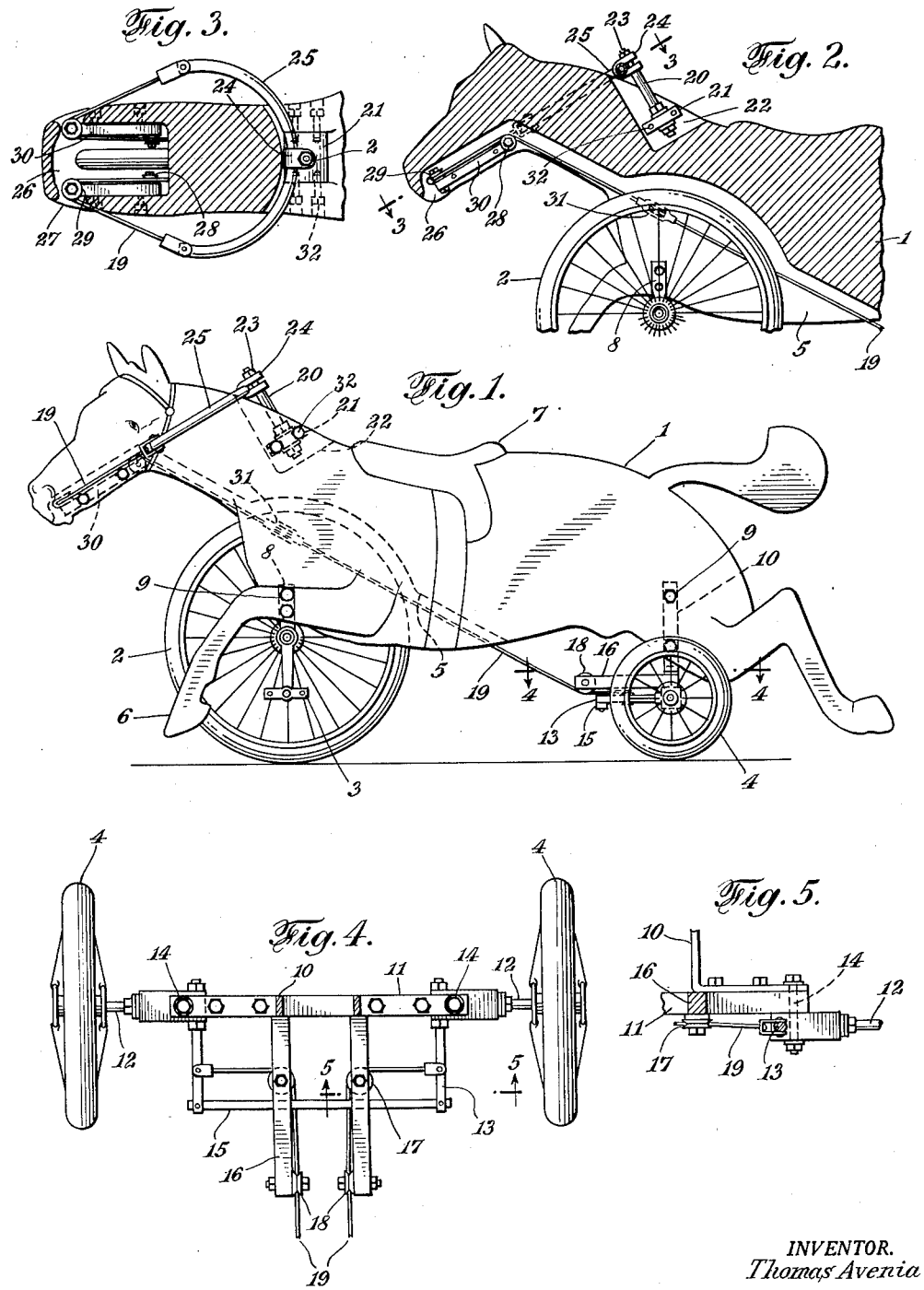
INVENTOR.
Thomas Avenia
BY
William F. Nickel
ATTORNEY.

Dec. 2, 1952 T. AVENIA 2,620,197
VEHICLE FOR JUVENILES
Filed Aug. 27, 1948 2 SHEETS—SHEET 2
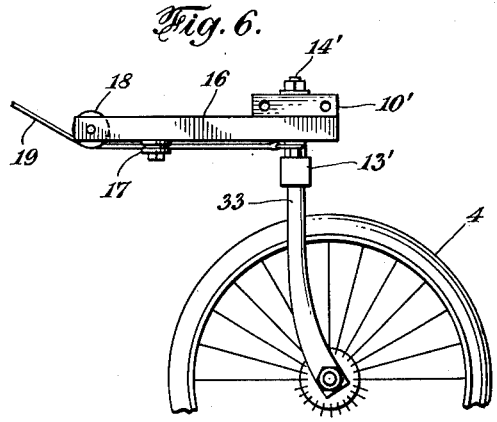
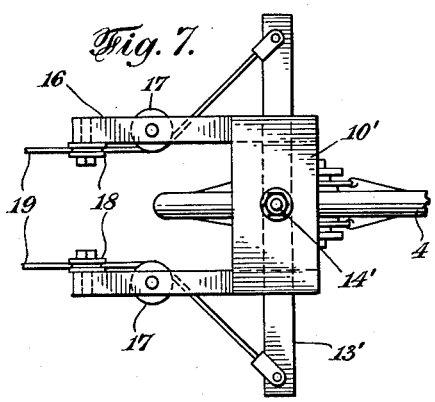
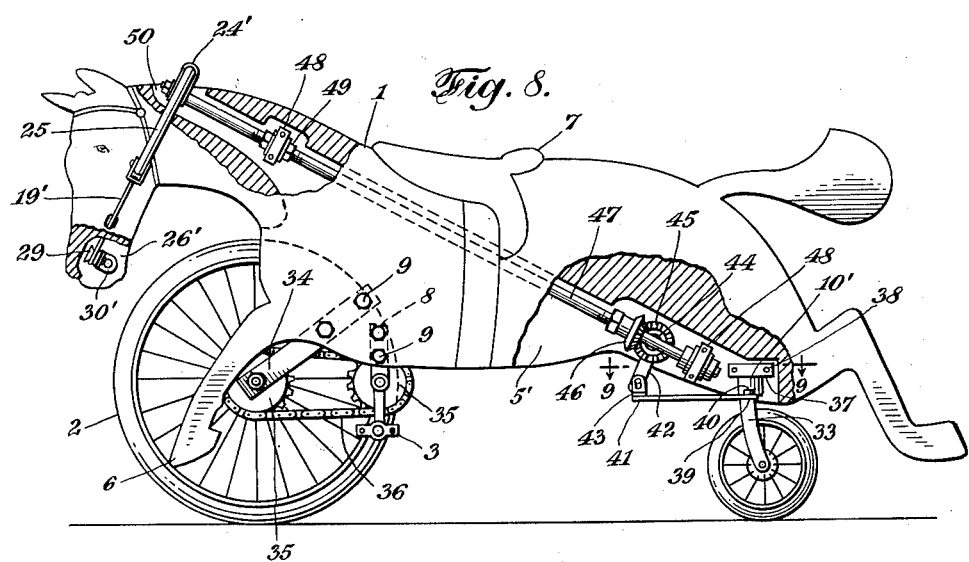
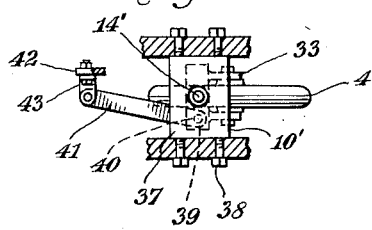
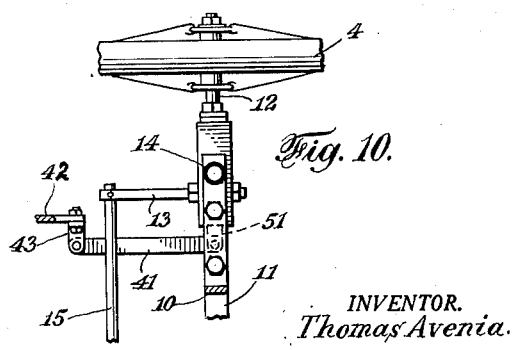
INVENTOR.
Thomas Avenia
BY
William F. Nickel
ATTORNEY.

Patented Dec. 2, 1952

2,620,197

UNITED STATES PATENT OFFICE 2,620,197

VEHICLE FOR JUVENILES

Thomas Avenia, New York, N. Y.

Application August 27, 1948, Serial No. 46,540

2 Claims. (Cl. 280—1.206)

This invention is an improvement in vehicles; and more particularly vehicles to be used by young people and children for amusement and exercise.

An important object of the invention is to provide a vehicle mounted on wheels and having connections for propulsion and steering; and comprising a body having the form of a horse or other animal bearing a seat. In front is the member for actuating the steering connections, with an imitation of bridle reins. The operator thus experiences fully the sensation of getting a horse-back or pony ride.

Other objects and advantages will appear from the description herein of the forms of the invention set out in the drawings; and I reserve the right to make changes in details of size, shape and arrangement of parts without departing from the principle of the invention, or going beyond the meanings of the terms defining the invention in the appended claims.

Figure 1 is a side view of one embodiment of my invention.

Figure 2 is a vertical longitudinal sectional view through the front part of the structure depicted on Figure 1.

Figure 3 is a horizontal sectional view in the plane of the line 3—3 in Figure 1.

Figure 4 is a horizontal sectional view on line 4—4 of Figure 1, showing steering connections.

Figure 5 is a vertical sectional view on the line 5—5 of Figure 4.

Figure 6 is a side elevation, showing part of the steering connections.

Figure 7 is a plan view illustrating an alternative steering arrangement.

Figure 8 is a view similar to Figure 1 showing another form of my invention.

Figure 9 is a horizontal section on line 9—9 of Figure 8; and

Figure 10 is a top plan of another type of steering connection for the vehicle of Figure 8.

The vehicle comprises a body 1, having the outline of a horse or other creature with the power of locomotion, mounted on a front wheel 2, with pedals 3 to propel the vehicle; and rear wheels 4 for steering. The body 1 is made of suitably strong material that can be shaped by molding or otherwise, and has a recess 5 in the underside for the wheel 2; which is mounted between the front legs 6.

The top of the body 1 carries a seat 7 for the rider, and this seat may have the form of a saddle. The wheel 2 is supported by means of bars 8, affixed by suitable fastening devices 9 to the inner faces of recess 5, and having bearings at each side of the front wheel 2 for the axle or journal thereof.

The bars 8 can be of any required length, and can be secured to the body 1 without fasteners by embedding the upper ends in the material of the body 1, if preferred.

The rear wheels 4, when two are used, are mounted by means of angle bars 10, the upper vertical parts of which are inserted into bores in the body 1 adjacent the rear, and secured as before by fastening devices 9. The devices 9 may be discarded in this instance also; and the bars 10 simply imbedded in the body like the bars 8. The lower horizontal parts of the bars 10 extend outward and are bolted to the top of an axle 11. See Figure 5. The hind legs of the animal are between the wheels 4; which are mounted on steering knuckles, in the form of bell crank levers having arms 12 with journals at the ends bearing the wheels 4 and arms 13 to turn the wheels 4 to one side when the direction of the vehicle is to be changed. The steering knuckles are secured to the axles 11 by pivot bolts 14. The arms 13 are connected by a cross rod 15 to swing both wheels together.

Bars 16 are affixed at one end to the axle 11, and extend forward, clearing the bar 15 and bearing on the under sides grooved guide pulleys 17. These pulleys rotate in horizontal planes, and on the front ends of the bars are similar pulleys 18 that rotate in vertical planes. Cords or chains 19 are attached to the arms 13, and pass over these pulleys and up to the head of the animal represented, where the steering handle is disposed.

Adjacent the head on the body 1 is an inclined tubular bearing 20, mounted on a base 21 affixed to both sides of a recess or cavity 22 in the top of the body and containing a pivot bolt 23, that projects from the upper end of the bearing 20. To the upper end of the bolt 20, projecting out of the body 1 is affixed a clamp 24 that grips a curved handle bar 25, extending transversely of the vehicle, and the clamp is made fast by an ordinary nut on the bolt 23. The head of the animal represented also has a recess or cavity 26 in its underside, this cavity being an extension of the cavity 5, and the head has side apertures 27 forward of the handle bar 25, in the part representing the mouth, and on the inside of the cavity 26 near the apertures 27 are pulleys 28 and 29. The former are mounted on horizontal journals and the latter on vertical journals, both pairs of pulleys being supported by members 30 in the cavity 26. The cords or chains 19 run over the pulleys 28 and 29 and out through the holes 27 and are attached to the ends of the handle bar 25. Hence, by turning the bar 25 and bolt 23 in the bearing 20, the wheels 4 are swung to one side or the other, through the action of the flexible elements 19 united to the bar 25 at their ends.

These elements may be cables or chains throughout, or part cable or chain, and part rods attached thereto in the cavity 5. The rods, when used are threaded to be connected by a turnbuckle 31 on each side of the wheel 2, to keep the steering cables taut.

The base 24 is affixed in the cavity 22 by screws 32.

Figures 6 and 7 show a type of steering mechanism in which only one wheel 4 is used. This construction is like a bicycle having a wheel 2 with pedals 3 in front and the one steering wheel 4 at the rear. The wheel 4 has an axle which is mounted in bearings at the lower ends of the arms of a fork or yoke 33, which has a journal 14' at its upper end. A suporting block 10' has a bearing opening in which the journal can rotate; and the yoke is held in place by a nut on the upper end of the journal. To the block 10' is affixed a cross bar 13', and secured to the ends of the block are the forward extending bars 16, carrying as before the pulleys 17 and 18. The rear ends of the cables 19 pass over the pulleys and are made fast to the ends of the cross bar, and when the handle bar 25 is turned, the wheel 4 is swung to one side or the other.

Figure 8 shows another form of the invention, comprising as before a body 1 with only one rear wheel 4 for steering. The front wheel is supported by bars 34 secured to the body and projecting forward. They carry at the front end the bearings for the front axle, and on this axle is a sprocket wheel 35. Short upright bars 8 carry a second sprocket 35, and the two sprocket wheels are connected by a chain 36. On the journal of the second sprocket are the pedals 3. The steering wheel 4 is again mounted in a yoke 33 having a journal 14' on its upper end, received in the bearing block 10'. The body 1 has a long recess or cavity 5', open at the underside; and this block is supported in bars 37, affixed to the sides of the cavity 5' near the rear end thereof, by screws 38, and as before a nut is screwed on the journal 14' above the block 10 to hold the wheel 4 in place. At one side of the yoke 33, secured to a shoulder 39, by a pin 40, is a link 41 operated by an arm 42. This arm has pin-and-slot connection to an angle piece 43, fixed on to the link 41, and when the link 41 is pushed or pulled, the link swings the wheel 4 from side to side. Other suitable means for affixing the block 10' in place can be adopted.

The arm 42 swings on a journal 44 mounted in one of the recesses 5' and is rigid with a bevel gear 45 therein. This gear meshes with a gear 46 keyed to a shaft 47, turning in bearings 48 in the two ends of the cavity 5'. It extends up through the neck to the head of the body 1, and is there affixed to an outside steering handle 25, curving across the back of the head. This handle is joined to the shaft 47 by a clamp 24' on the shaft 47. To the ends of this handle bar 25 is attached a cord or chain 19', which extends through openings in the sides of the part representing the mouth. This part has a cavity 26'; containing grooved guide wheels 29 supported on journals carried by fixed angle pieces 30'. The cord 19' merely imitates a steering bridle, and the wheel 4 is swung by the handle 25 turning the shaft 47 and arm 42. The cavity 5' is open throughout along the lower side of the body and contracts in the neck, leading to an opening 50 for the front end of the shaft 47. The bearings 48 are in fixed position and nuts 49 on the shaft 47 at the upper bearing keep the shaft from slipping.

This type of connection for steering can also be utilized with two rear wheels 4, as illustrated on Figure 10. An axle 11 of the same form as described above in connection with Figures 4 and 5 is employed, and secured to the body by angle elements 10 attached to the body between the rear legs in the same way. The arms 13 of the steering knuckles are joined by a cross rod 15. The connector 41 is pinned to a lug 51 on one steering knuckle. Motion of the arm 42 when the shaft 47 is rotated now suffices to swing the wheels 4 from side to side to change the direction of the vehicle.

The bars 34 and 8 are secured by fasteners 9, or they can be without fasteners and embedded firmly in the body 1, as described above. Also the body shown in Figure 8 having the large recess 5' can be reinforced within the recess or elsewhere as may be necessary.

From the foregoing description the invention will be clearly understood. The vehicle is not only novel in construction, and of simple but effective design, but also has a very attractive appearance. The sprocket wheel drive for the front wheel is important, because it brings the pedals within easy reach from the seat.

Having described my invention, what I believe to be new is:

1. A vehicle having a body representing an animal having a head, a front wheel and pedals for rotating said wheel, sprocket wheels and a chain connecting the pedals to the wheel, means comprising a wheel vertically pivoted to the body at the rear for steering, a handle bar pivotally mounted at the front of the vehicle, and connections between said bar and said pivoted wheel, said connections comprising a shaft rotatably carried by the body, said handle bar being affixed to the front end of the shaft, a gear wheel affixed thereon adjacent the opposite end of the shaft, a second gear wheel in mesh with said first gear wheel rotatably mounted on the body, an arm rigid with said second gear wheel, and a link connecting said arm to said pivoted wheel.

2. A vehicle having a body representing an animal having a head, a front wheel and pedals connected thereto for rotating said wheel, means comprising a wheel vertically pivoted to the body at the rear for steering, a handle pivotally mounted at the back of the head and having its ends extending forward at the sides of head, a shaft rotatably mounted in the body and affixed to the handle at its front end, the shaft extending downward at an incline towards the wheel at the rear, said last named wheel having an arm connected thereto, a gear on the shaft, a gear on the body meshing with the gear on the shaft, an arm operated on said last-named gear and a link connecting said arms.

THOMAS AVENIA.

REFERENCES CITED

The following references are of record in the file of this patent:

UNITED STATES PATENTS

| Number | Name | Date |
|---|---|---|
| Re. 8,252 | Reynolds | May 28, 1878 |
| 93,967 | Combs | Aug. 24, 1869 |
| 1,108,789 | Robbins | Aug. 25, 1914 |
| 1,304,985 | Johnson | May 27, 1919 |
| 1,377,888 | Hunarian | May 10, 1921 |
| 1,546,231 | Gryckowski | July 14, 1925 |
| 1,548,434 | Berg | Aug. 4, 1925 |
| 1,621,193 | Eichhorst | Mar. 15, 1927 |
| 1,784,875 | Jesswein | Dec. 16, 1930 |
| 2,147,860 | Sharp | Feb. 21, 1939 |
| 2,253,096 | Sheldon | Aug. 19, 1941 |
| 2,259,987 | Bailie | Oct. 21, 1941 |
| 2,474,870 | Sheldon | July 5, 1949 |

FOREIGN PATENTS

| Number | Country | Date |
|---|---|---|
| 8,147 | Great Britain | May 11, 1889 |
| 13,294 | Great Britain | July 4, 1885 |
| 28,372 | Switzerland | June 8, 1903 |